United States Patent Office 3,079,293
Patented Feb. 26, 1963

3,079,293
PROCESS OF JOINING POLYETHYLENE
TEREPHTHALATE FILMS
Stephen D. Marcey, Dayton, Ohio, assignor to The National Cash Register Company, Dayton, Ohio, a corporation of Maryland
No Drawing. Filed May 4, 1959, Ser. No. 810,589
1 Claim. (Cl. 156—325)

This invention relates to a method for joining films of polyethylene terephthalate, and particularly pertains to such a process utilizing a joining fluid which consists of a mixture of isomers of the methyl derivatives of bicyclo [2.2.1] heptene-2, 3-dicarboxylic anhydride (the latter also referred to in the literature as 3,6-endomethylene-$\Delta^4$-tetrahydrophthalic anhydride), in which isomers the methyl group replaces one of the hydrogens shown in the following general structural formula:

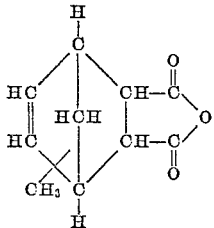

The mixture, which has a molecular weight of 178.2 and a distillation range of 135 to 143 degrees centigrade at 10 mm. of mercury, and is miscible in all proportions at room temperature with acetone, benzene, naphtha, and xylene, is sold, under the trademark "Nadic" Methyl Anhydride, by Allied Chemical Corporation, 40 Rector Street, New York 6, New York, United States of America. This mixture is applied to one or both the surfaces to be joined in face-to-face relation, placing the surfaces together and thereafter applying heat and pressure thereto, the heat necessary being of the order of 400° Fahrenheit and the pressure necessary being only that sufficient to hold the parts in contact until cross-linking occurs. The duration of heat application is as little as from one to three seconds for a joinder of two films of several mils in thickness each. In practicing the invention, to make a smooth joint without a double thickness, where the ends of two tapes, for instance, are to be joined, the ends of such tapes are ground off to half their thickness for a length which represents the length of the joint to be made, and the so-grounded-off tape ends are placed face-to-face and joined by heat after having had applied thereto a small amount of the liquid agent, the structure of which has been given above.

Conveniently, the parts to be joined, after having been positioned in face-to-face relation, with the liquid in between, are placed on a smooth, hard, and heat-resistant surface, and a smooth, hot iron of the required temperature is applied with the pressure necessary to hold the ends of the film together. In order that there be no substantial lowering of temperature by reason of heat conductivity in the material of the surface on which the films are laid during the joinder process, such material can be of low heat-transfer type such as cardboard, heat-resistant polymer films, stone, and the like.

The specified liquid material which is used as a joining agent seems not to act as a solvent, as solvents for the polyethylene terephthalate seem to quickly destroy the films in an irreversible manner, whereas liquid used in this process seems to act as a cross-linking agent.

The polyethylene terephthalate material, in film form, can now be obtained from the E. I. duPont de Nemours & Company, Wilmington, Delaware, U.S.A., under the name of "Mylar."

What is claimed is:

The process of joining thin films of polyethylene terephthalate, in face-to-face relation, consisting of the steps of applying to the surfaces to be joined a coating of a liquid which consists of a mixture of isomers of the methyl derivatives of bicyclo [2.2.1] heptene-2,3-dicarboxylic anhydride, in which isomers the methyl group replaces one of the hydrogens shown in the following general structural formula of said isomers, the mixture having a molecular weight of 178.2 and a distillation range of 135 to 143 degrees centigrade at 10 mm. of mercury, and being miscible in all proportions at room temperature with acetone, benzene, naphtha, and xylene:

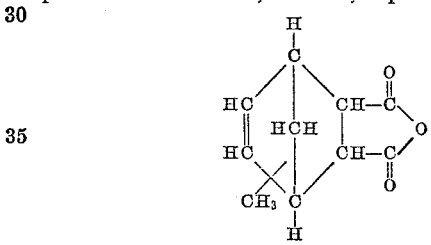

placing the coated surfaces in contact; and thereafter uniformly applying pressure and heat to the intended joint, the heat required being of the order of 400° Fahrenheit, over a period of several seconds, and the pressure being such as to hold the materials in contact.

References Cited in the file of this patent

UNITED STATES PATENTS

| | | |
|---|---|---|
| 2,343,975 | Hosfield | Mar. 14, 1944 |
| 2,849,359 | Smith | Aug. 26, 1958 |
| 2,893,969 | Graham | July 7, 1959 |
| 2,895,866 | Amon et al. | July 21, 1959 |
| 2,933,468 | Aldridge et al. | Apr. 19, 1960 |

FOREIGN PATENTS

| | | |
|---|---|---|
| 645,032 | Great Britain | Oct. 25, 1950 |
| 799,046 | Great Britain | July 30, 1958 |